United States Patent [19]

Grill

[11] Patent Number: 4,659,148
[45] Date of Patent: Apr. 21, 1987

[54] VEHICLE WHEEL CONSTRUCTION
[75] Inventor: Paul E. Grill, Lansing, Mich.
[73] Assignee: Motor Wheel Corporation, Lansing, Mich.
[21] Appl. No.: 778,973
[22] Filed: Sep. 23, 1985
[51] Int. Cl.$^4$ .............................................. B60B 7/00
[52] U.S. Cl. ................................ 301/37 P; 301/37 R; 301/37 CM
[58] Field of Search ........................... 301/37 R, 37 P; 301/63 PN, 63 R, 105 R, 108 R, 108 A, 37 CM, 37 S, 37 SC, 108 S

[56] References Cited

U.S. PATENT DOCUMENTS

| | | | |
|---|---|---|---|
| 2,276,405 | 3/1942 | Lyon | 301/37 CM X |
| 3,537,756 | 11/1970 | Spisak | 301/108 R |
| 3,549,204 | 12/1970 | Spisak | 301/108 S X |
| 3,669,501 | 6/1972 | Derleth | 301/63 R X |
| 3,756,658 | 9/1973 | Adams | 301/63 R X |
| 3,823,982 | 7/1974 | Spisak | 301/37 P |
| 3,827,756 | 8/1974 | Mitchell | 301/63 R |
| 3,998,494 | 12/1976 | Spisak | 301/37 P |
| 4,251,476 | 2/1981 | Smith | 301/37 R X |
| 4,270,805 | 6/1981 | Spisak | 301/108 R X |
| 4,398,770 | 8/1983 | Smith | 301/37 P X |

FOREIGN PATENT DOCUMENTS 1290946 9/1972 United Kingdom .
1327391 8/1973 United Kingdom .

Primary Examiner—Robert B. Reeves
Assistant Examiner—Russell D. Stormer
Attorney, Agent, or Firm—Barnes, Kisselle, Raisch, Choate, Whittemore & Hulbert

[57] ABSTRACT

A composite styled wheel including a metallic disc and rim adapted to receive a tire thereon, and a plastic ornamental overlay comprising a body of an elastomer material permanently adhesively affixed to said disc and rim and exposed to view from the outboard side of said wheel. The disc has a central aperture and wheel bolt holes therein and a retainer is secured to the outboard face of the disc and has a wall encircling the disc holes which separates the overlay material from the bolt circle area of the disc. The overlay material engulfs the retainer wall and thereby hides the retainer from view and assists in securement thereof to the disc. The overlay is cast and cured against the disc with the retainer pre-secured thereto. The disc outboard surface is provided with nubbins for snap-in retention of the retainer on the disc. Hollow shield members may be inserted individually into retainer apertures and each associated disc bolt hole to prevent water collection in the interior space of the retainer. The retainer may have an interior wall configuration to provide water drainage from the interior space of the retainer. An improved method of making the improved composite styled wheel is also described.

16 Claims, 14 Drawing Figures

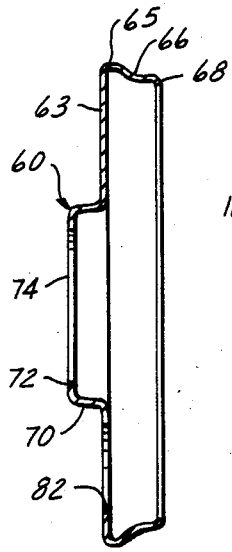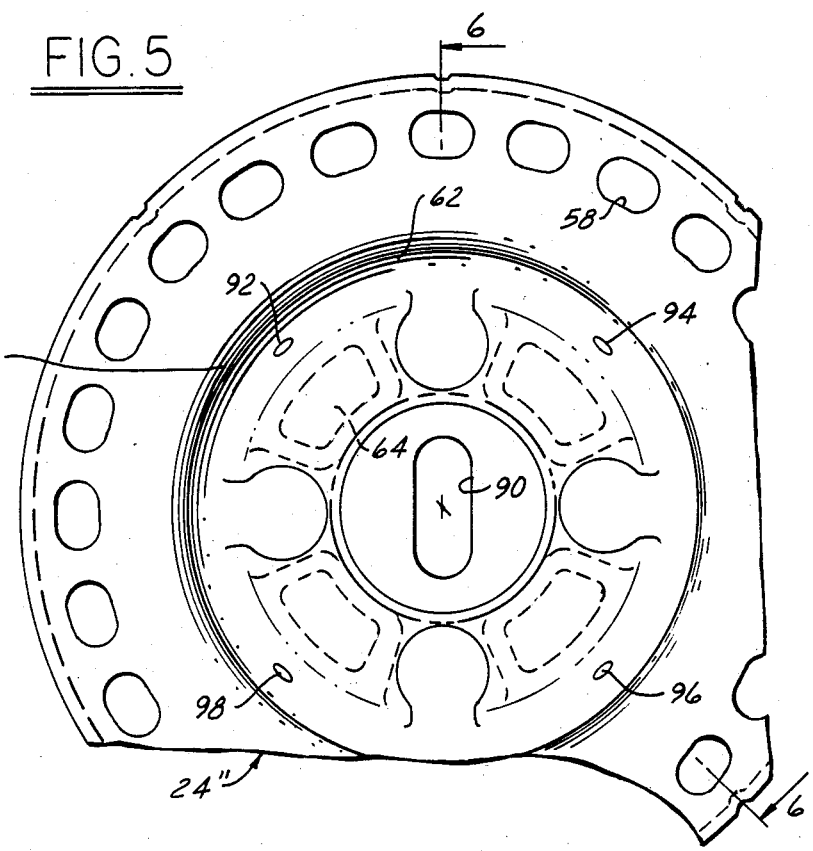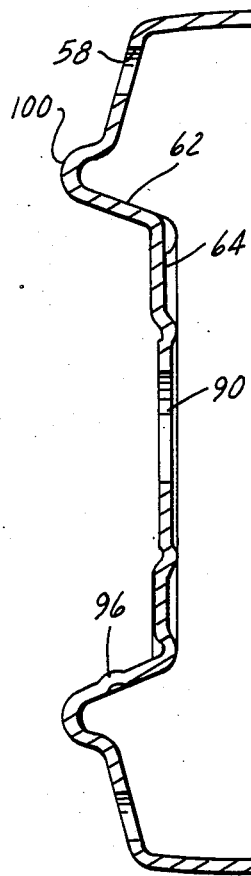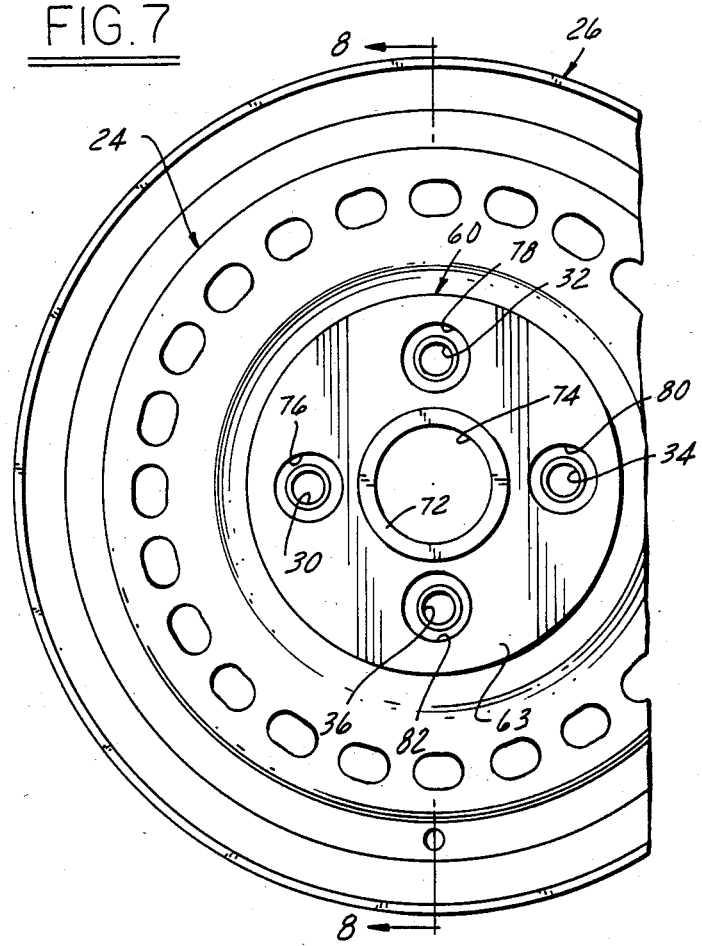

VEHICLE WHEEL CONSTRUCTION

This invention relates to vehicle wheels and more particularly to a composite steel/elastomer wheel construction provided with a decorative outer finish for styling of the wheel, and method of making the same.

Automotive passenger vehicle wheels of the so-called "styled steel wheel" variety, having three dimensional deeply contoured ornamental discs or bodies, were introduced in the early 1960's by the assignee of applicant herein, Motor Wheel Corporation, and are a popular form of styled wheel yet today. The deeply contoured ornamental configuration of the disc is usually produced by deep drawing a flat steel plate. These draws are usually so deep that the wheel disc must be formed in several stages of press operations and it is sometimes necessary to anneal a disc between some of the drawing stages. Such severe drawing operations are also accompanied by relatively short die and tooling life. For these reasons the deep drawing of ornamental wheel discs is a relatively expensive way of producing ornamental wheels.

In the late 1960's and early 1970's Motor Wheel Corporation, as well as its patent, The Goodyear Tire & Rubber Company of Akron, Ohio, developed and introduced another form of styled wheel known by the registered trademark "POLYCAST". Such later-developed styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in situ as a homogeneous one-piece body or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the aforementioned styled steel wheels.

Various embodiments of such "POLYCAST" wheels, as well as methods and apparatus for producing the same, are set forth in the following United States Patents assigned either to the assignee herein or its parent, The Goodyear Tire & Rubber Company, which are incorporated herein by reference:

U.S. Pat. No. 3,669,501, June 1972, Derleth;
U.S. Pat. No. 3,756,658, Sept. 1973, Adams;
U.S. Pat. No. 3,762,677, Oct. 1973, Adams;
U.S. Pat. No. 3,815,200, June 1974, Adams;
U.S. Pat. No. 3,918,762, Nov. 1975, Hampshire;
U.S. Pat. No. 3,794,529, Feb. 1974, Thompson;
U.S. Pat. No. 3,935,291, Jan. 1976, Jackson;
U.S. Pat. No. 3,956,451, May 1976, Adams;
U.S. Pat. No. 4,398,770, Aug. 1983, Smith.

Other prior art patents issued to unrelated parties and directed to various facets of such styled composite metal and plastic wheels include U.S. Pat. Nos. 3,823,982; 3,998,494 and British Pat. No. 1,290,946 (1972).

The inventions of the above-listed "POLYCAST" patents have achieved widespread commercial success; millions of such "POLYCAST" wheels having been successfully made and sold over the past fifteen years in almost an infinite variety of decorative configurations and ornamentation of the plastic outboard face component. However, the changing nature of automotive vehicle construction in this rapidly evolving period, such as the widespread adoption of disc brakes and front wheel drive vehicles have, in some instances, resulted in wheel applications where heat generated during braking has been conducted and/or radiated from the brake hub into the steel disc of the wheel so as to cause excessively high temperatures in the so-called bolt circle and center hole area of the disc of the wheel. This in turn has created a heat damage problem in some "POLYCAST" wheel designs embodying the so-called "full-face" stying, wherein the urethane foam of the plastic component is molded or adhered to the outboard face of the steel disc so as to overlie the bolt circle and adjacent face of the disc immediately radially outwardly thereof. Under extreme conditions, such as adverse braking test schedules, the urethane material has been found to experience cracking and/or melting when these types of wheels are subjected to interface temperatures in the range of 400+° F. This problem cannot be satisfactorily alleviated by merely changing the mold construction so as to terminate the urethane material sufficiently radially outwardly from the center of the wheel disc to avoid the hot spot area because this would impair the desired design flexibility relative to the potential styling available from the urethane plastic component and thereby impair the potential marketability of this construction to the automotive designer.

Accordingly, it is an object of the present invention to provide an improved "POLYCAST" wheel construction which overcomes the aforementioned heat cracking or melting of the urethane foam in adverse applications while enabling the decorative overlay to retain a "full-face" appearance, as well as to have decorative deep three dimensional contours at least adjacent to, if not directly in, the center area of the wheel in the vicinity of the bolt circle hot spot area.

Another object of the present invention is to provide an improved "POLYCAST" wheel construction of the aforesaid character which is relatively inexpensive to manufacture, which is versatile in nature relative to the solution of the aforementioned overheating problem, reliable in service and readily adaptable to support center ornamentation, such as detachable decorative hub caps or the like.

A further object is to provide an improved method for making the aforementioned wheel construction which is inexpensive, reliable and compatible with the prior method and apparatus for making prior art wheels of this type.

Other objects, as well as features and advantages of the present invention will become apparent from the following detailed description taken in conjunction with the accompanying scaled drawings, wherein:

FIG. 4 is a vertical cross sectional view taken on the line 4—4 of FIG. 3;

FIG. 5 is a fragmentary vertical elevational view of the outboard side of the partially-finished wheel disc employed in the wheel construction of FIGS. 1 and 2;

FIG. 6 is a vertical cross sectional view taken on the line 6—6 of FIG. 5;

FIG. 7 is a vertical elevational view of the outboard face of the wheel disc and rim assembly with a retainer of FIGS. 3 and 4 mounted thereon as utilized in the embodiment of FIGS. 1 and 2, but prior to the molding of the urethane plastic component to the outboard face of the wheel assembly;

Figure 1:
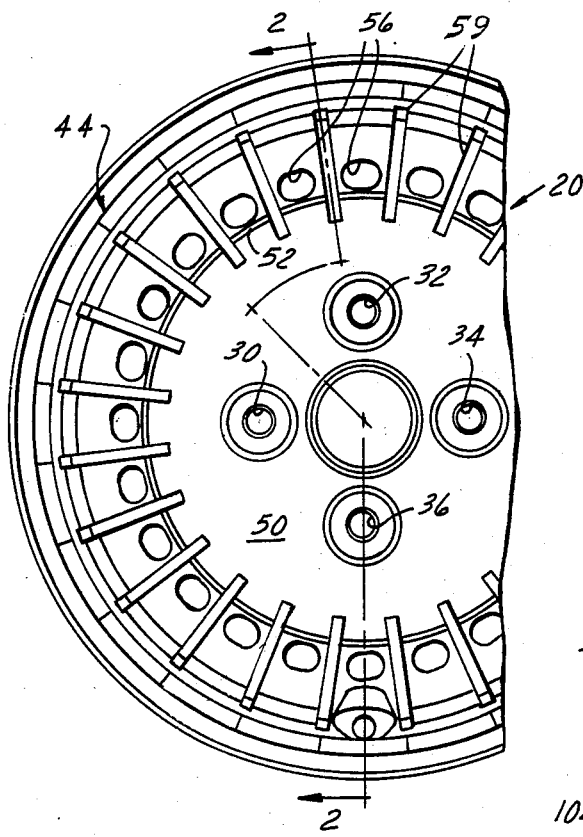
FIG. 1 is a fragmentary vertical electrical view of the outboard face of a composite steel and plastic wheel construction made in accordance with one embodiment of the present invention.
Figure 2:
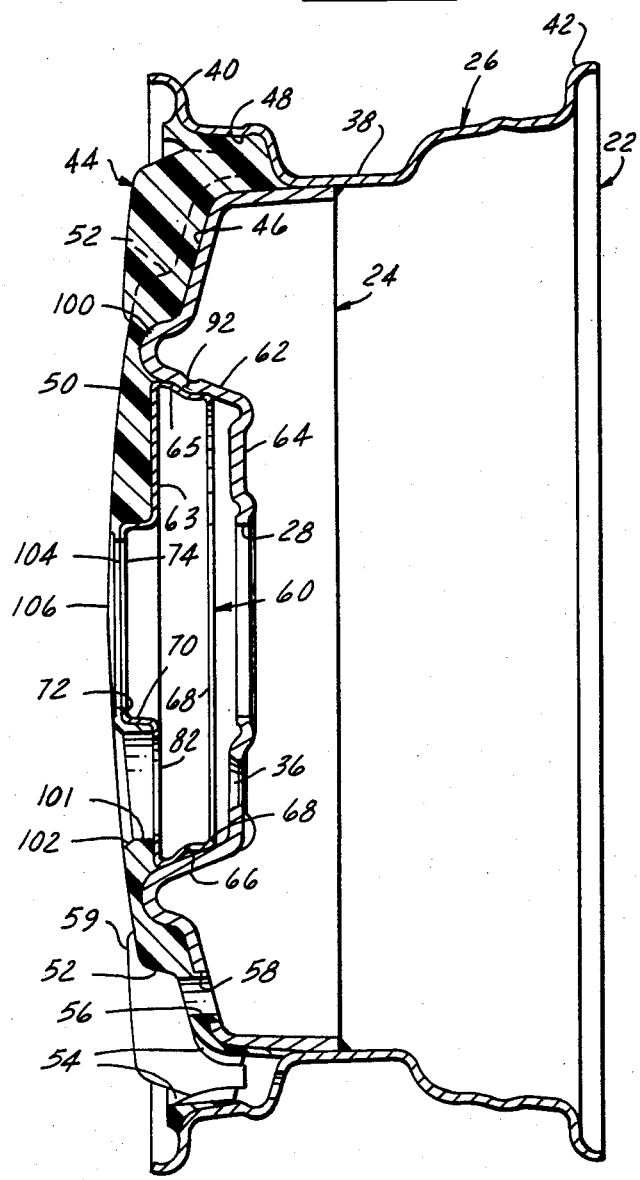
FIG. 2 is a vertical cross sectional view taken on the line 2—2 of FIG. 1.

Referring in more detail to the accompanying drawings, particularly FIGS. 1 and 2, the first embodiment 20 of a wheel assembly in accordance with the invention illustrated therein comprises a metallic wheel 22 including a wheel disc 24 and a drop center rim 26 of conventional configuration secured around and to the periphery of disc 24. Disc 24 includes a central opening 28 adapted to be received over a wheel hub, and a circumferential array of openings 30,32,34,36 surrounding hub opening 28 and adapted to be received over the usual threaded lugs for mounting wheel 20 to a verticle spindle. Rim 26 includes a drop center well 38 and the usual axially spaced bead retaining flanges 40 and 42 for mounting thereon a typical tubeless pneumatic tire (not illustrated). The cross sectional contour and other details of disc 24 and rim 26 may be of any suitable configuration and do not per se form part of the present invention, except as to certain modifications to disc 24 noted hereinafter.

A molded or cast overlay 44 is permanently secured to the axially outboard face 46 of disc 24 and to that portion 48 of the radially inwardly facing surface of rim 26 contiguously adjacent disc outboard face 46. Most preferably, overlay 44 comprises an elastomeric urethane construction permanently adhesively affixed to wheel faces 46 and 48 by reason of being molded thereon in a manner as taught in the aforementioned Adams U.S. Pat. Nos. 3,756,658; 3,762,677; 3,815,200 and 3,956,451, with certain modifications to these teachings as set forth in more detail hereinafter.

In wheel embodiment 20 the decorative plastic overlay 44 is molded to provide on its outboard face a major face 50 of slightly convex configuration extending over about two-thirds of the central area of the outboard face of wheel 20 and bounded on its radially outermost edge by a shoulder 52. Overlay 44 radially outwardly of face 50 has an inset face 54 forming a trench-like configuration overlying the radially outermost portion of disc 24 and rim surface 48, with apertures 56 therein registering with disc apertures 58. A plurality of relatively short radially extending fins 59 extend outboard from surfaces 52 and 54 between apertures 56 to lend a further distinctive decorative configuration to overlay 44.

In accordance with a principal feature of the present invention, the urethane material of overlay 44, although having a "full-face" appearance and covering substantially all of the outboard face of wheel 22, is held spaced away or out of contact from the potentially high temperature zone of disc 24 by a specially formed retainer member 60 seated in and spanning across the frusto-conical portion 62 of wheel disc 24 and spaced axially in an outboard direction from the bolt circle portion 64 of disc 24.

Figure 3:
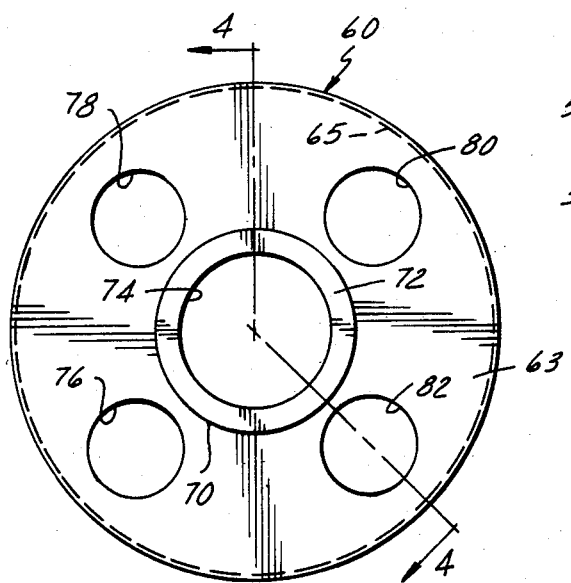
FIG. 3 is a vertical elevational view of the outboard side of a retainer part used in the wheel construction of FIGS. 1 and 2.

Referring to FIGS. 3 and 4, retainer 60 in the embodiment of FIGS. 1 through 8 comprises a generally hat-shaped annulus made from a sheet metal, such as mild steel, by conventional stamping, rolling and/or spinning operations. Retainer 60 thus has a generally flat circular outer wall 63 bounded on its outer periphery by a flange 65 which extends axially and is radially inclined inwardly toward the axis of retainer 60 (FIG. 4) at an angle complementary to the angle of the frusto-conical portion 62 of disc 24. Flange 65 is formed with a circumferentially extending continuous groove 66 and terminates in a radially in-turned free edge flange 68. The central portion of retainer 60 has a flange 70 extending outboard from wall 63 and terminating in a radially in-turned flange 72 defining a circular central opening 74 in retainer 60. Wall 63 has four equally angularly spaced circular openings 76,78,80,82 formed therein adapted to register co-axially with disc bolt holes 30,32,34,36, respectively, in the mounted position of retainer 60 on the disc, and approximately twice the diameter of bolt holes 30-36.

In the manufacture of composite wheel 20 utilizing retainer 60, disc 24 is first made as a separate piece in a preferred "POLYCAST" backbone configuration as a stamped steel preform 24" illustrated in FIGS. 5 and 6. In this intermediate stage the center of disc preform 24" has a processing orientation slot 90 and the bolt circle portion 64 is stamped to essentially final configuration. However, the bolt holes and center hole 28 are not as yet formed since this operation is preferably completed in a so-called pierce-after operation after preform 24" is assembled and welded to rim 26. In the stamping of preform 24" four equally angularly spaced nubbins 92,94,96,98 are formed to protrude from the outboard surface of disc frusto-conical portion 62. Nubbins 92-98 are each identical and form a convex protrusion of generally eliptical contour with its major axis extending circumferentially of the disc. Each nubbin 92-98 is preferably circumferentially centered between adjacent bolt holes of the disc, and positioned axially of the wheel approximately halfway between bolt circle portion 64 and the hat section crown 100 of disc 24, as best seen in FIGS. 2 and 6.

Figure 8:
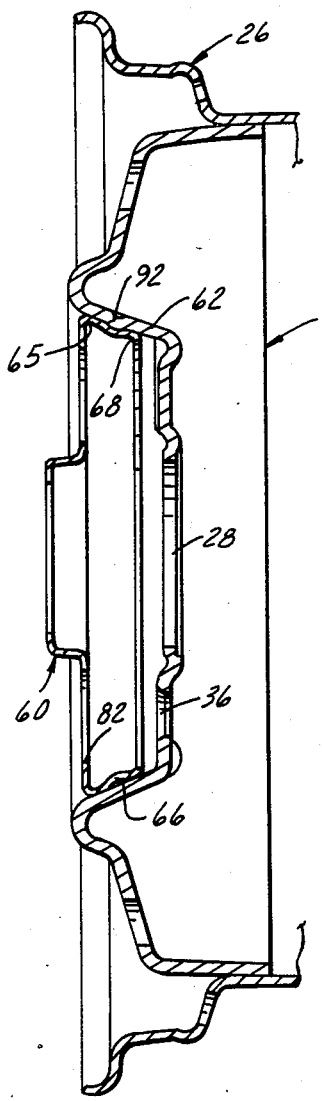
FIG. 8 is a vertical cross sectional view taken on the line 8—8 of FIG. 7.

After disc preform 24' is assembled and welded to rim 26, the disc-rim assembly is further processed through the pierce-after operation wherein the assembly is fixtured by clamping the rim and, in a punching pierce operation, bolt holes 30–36 and the center hole 74 are formed and coined to provide the finished disc-rim sub-assembly shown in FIG. 8. Then retainer 60 is assembled to disc 24 by inserting the same endwise into the disc coaxially therewith so as to force edge flange 68 slideably past nubbins 92–98. Flange 65 has sufficient flexibility and resilience to compress and yield to accommodate this interference fit and to cause flange 65 to spring back out once axially inboard of the associated nubbin. Once groove 66 of retainer 60 registers with nubbins 92–98, retainer 60 is firmly held on disc 24 by this temporary snap-in retention.

After the wheel and retainer sub-assembly of FIGS. 7 and 8 has been prepared, the same is clamped onto a mold and a liquid urethane reaction mixture material is introduced into the mold cavity to form the overlay 44, as set forth in more detail in the aforementioned "POLY-CAST" patents. However, the mold is modified to provide a suitable core at each of the retainer apertures 76–82 which abuts wall 63 around the margin of each aperture to provide a circular wall 101 and associated bevel 102 (FIG. 2) of urethane material spaced radially slightly outwardly from the periphery of the associated opening in wall 63. Likewise, a central core is provided in the mold to cover retainer central opening 74 and form a circular wall 104 and offset step 106 of urethane outwardly of and around retainer opening 74.

It will be noted that retainer 60 during the molding operation provides a dam or barrier for the liquid urethane material as the same is being introduced via selected openings 58 to fill the mold cavity defined between the outboard face of the metallic parts of the wheel and the juxtaposed mold cavity surface (not shown). Retainer 60 thus prevents the urethane material from entering into the space defined between the interior surfaces of the retainer and the outboard faces of the bolt circle portion 64 and frusto-conical portion 62 of the disc. However, the urethane flows over and covers the outboard surfaces 63,70,72 of retainer 60 so that, once cast and cured, overlay 44 also covers the central portion of the outboard face of the wheel to provide the aforementioned "full-face" decorative appearance. Nevertheless, once the finished wheel 20 is vehicle mounted, excessive heat generated during braking, causing high temperatures in the bolt circle region 64 and even out into the frusto-conical portion 62 of the disc, will not adversely affect the urethane material of overlay 44. In addition, since there is no urethane material against these surfaces, heat will be dissipated more readily from the wheel so that crown portion 100 and contiguous portions of the disc 24 radially outwardly thereof will not experience damaging high temperatures despite adverse braking conditions.

Another advantage of retainer 60 is that it provides a relatively rigid and secure supporting material for any suitable detachable hub cap or similar ornamentation which may be releasably secured into the central opening 74 so as to engage and grip the flange 72 of retainer 60. In addition, openings 76–82 in part 60 provide suitable access to the wheel mounting lugs and associated chrome plated decorative nuts typically employed in vehicle mounting of such composite POLYCAST styled wheels. The temporary snap-in retention of part 60 onto disc 24 is sufficiently secure to permit factory handling of the part and molding of the overlay 44, without adding undue manufacturing costs. Once overlay 44 has been cast over retainer 60 and fully cured, the urethane itself will adhere to the retainer and permanently secure the same in place.

Figure 9:
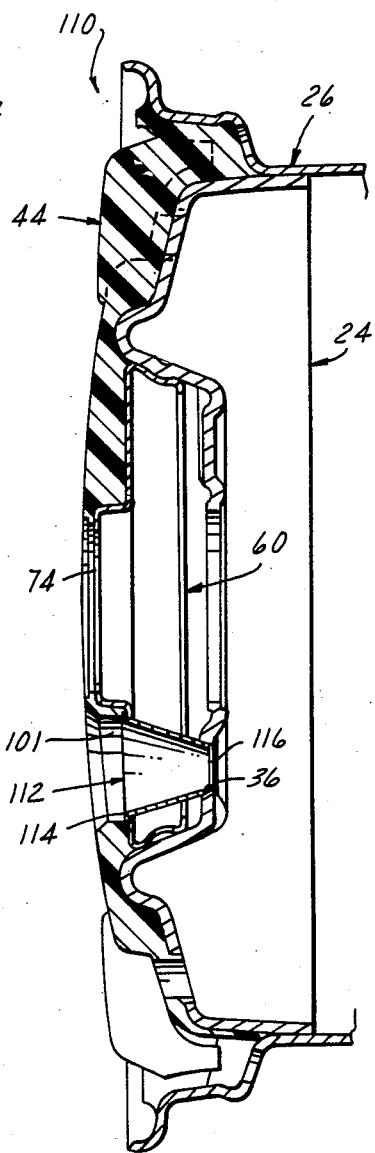
FIG. 9 is a vertical cross sesctional view similar to that of FIG. 2, but illustrating a first modification of the invention incorporating a mounting bolt pocket shield inserted into each of the four mounting bolt openings of the retainer part and associated wheel disc bolt holes.

Referring to FIG. 9, a modified composite wheel 110 is illustrated therein which is similar to wheel 20, like reference numerals being utilized to indicate like elements from the previous embodiment. Wheel 110 differs from wheel 20 in that, after assembly of retainer 60 to disc 24 as described previously and prior to the urethane molding operation, a frusto-conical funnel-like waterproof shield 112 is inserted into each of the apparatus 76–82 of retainer 60 from the outboard face thereof. Shield 112 has a radially extending flange 114 adapted to seat against the outboard face of wall 62 around the margin of the associated aperture 76–82, and is dimensioned at its inboard end 116 to seat snugly against the wall of the associated disc bolt hole 30–36. During the molding operation in producing the overlay 44, the urethane material will surround the mold core to provide the aforementioned wall 101 and will also overlie flange 114 of shield 112 to permanently retain the same in place, as well as to provide a moistureproof seal around the joint formed between flange 114 and wall 63 of retainer 60. Shields 112 thus provide wheel nut access cavities which function to seal off the interior heat isolation space defined between retainer 60 and the juxtaposed outboard face of disc 24 so that water cannot collect in this cavity, a condition which might otherwise lead to ice formation damage to the wheel. Of course, the retainer center opening 74 is also sealed against water invasion by the provision of the aforementioned detachable hub cap mounted releasably therein (not illustrated).

Figure 10:
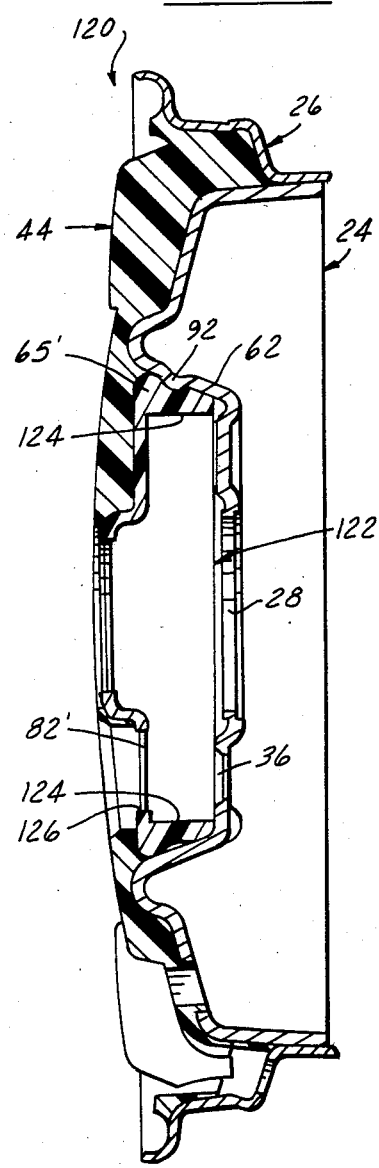
FIG. 10 is a view similar to FIG. 9 but illustrating a modified retainer of the invention employed in the wheel construction.
Figure 11:
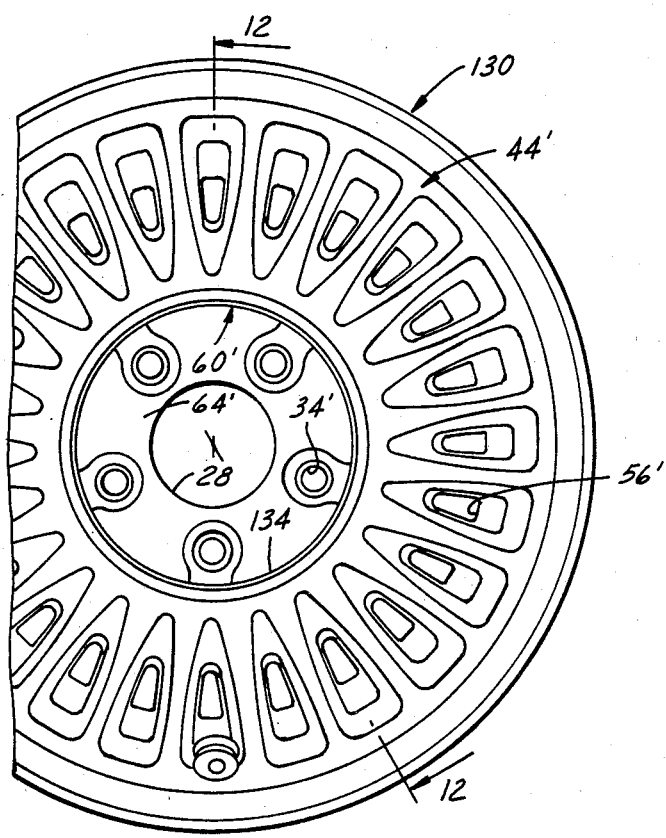
FIG. 11 is a fragmentary vertical elevational view of the outboard face of another embodiment of a composite steel and plastic styled wheel construction made in accordance with the present invention.

Referring to FIG. 10, a further modified wheel 120 is illustrated employing the principles and features of the present invention, and again like reference numerals are utilized to identify components described previously. Wheel 120 utilizes a modified snap-in retainer 122 which is generally similar in structure, assembly and function to retainer 60 as described previously herein. However, retainer 122 is injection molded from a suitable plastic material selected to achieve the advantages of material economy, corrosion resistance and weight savings, e.g Dupont Minlon 21-C or equivalent. In addition, retainer 122, while having an exterior surface configuration substantially identical to retainer 60, differs therefrom in that the flange 65' is substantially thicker in radial cross section than flange 65. Flange 65' thus has an interior cylindrical wall 124 that is spaced radially outwardly only a slight distance from the lip 126 of each of the associated wheel nut access openings 76'–82' provided in retainer 122 therein. Hence any water entering into the open cavity defined by the interior of the retainer 122 will drain out of this cavity by gravity through lowermost of the access openings 76'–82' when the wheel comes to rest. The water barrier shield 112 of the wheel 110 thus may be eliminated when utilizing the modified construction of wheel 120.

Figure 12:
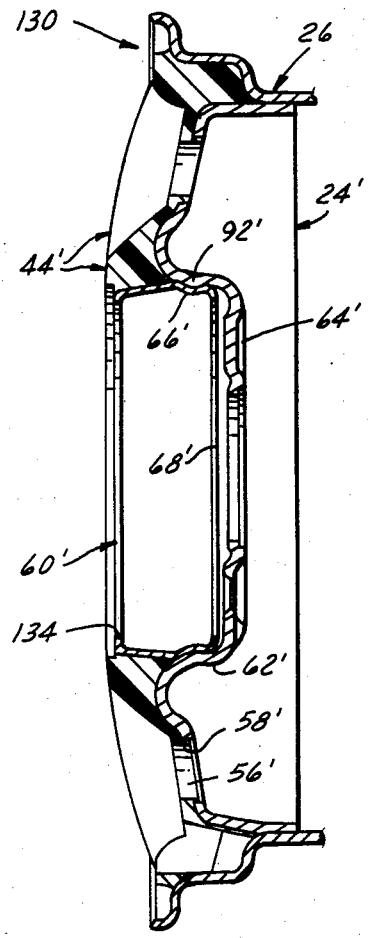
FIG. 12 is a fragmentary cross sectional view taken on the line 12—12 of FIG. 11.
Figure 13:
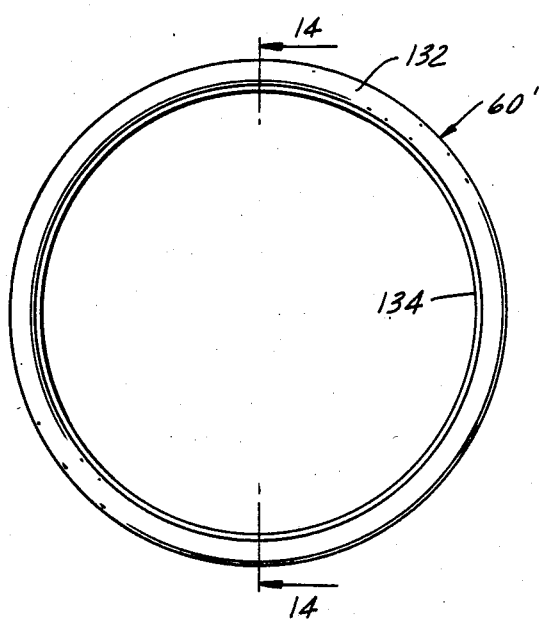
FIG. 13 is a vertical elevational view of the outboard face of the modified retainer employed in the wheel construction of FIGS. 11 and 12.
Figure 14:
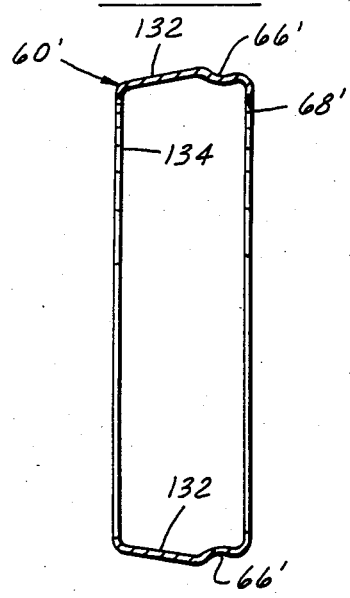
FIG. 14 is a cross sectional view taken on the line 14—14 of FIG. 13.

Referring to FIGS. 11 to 14, another embodiment of a wheel construction 130 in accordance with the present invention is illustrated therein, like reference numerals being applied to identical elements described previously and prime suffix numerals used for those modified elements corresponding in function and operation to elements previously described. Wheel 130 again has a urethane decorative body 44' molded to the outer faces of discs 24' and rim 26, with the urethane being held away from the potential high temperature areas 64' and 62' of the disc 24' by a modified retainer 60'. Disc 24' is provided with nubbins 92'-98' corresponding to the nubbins of wheel 20 described in connection with FIG. 5. Referring to FIGS. 13 and 14, retainer 60' is in the form of a stamped or rolled sheet metal annulus having at its inboard end a radially in-turned flange 68' and adjacent thereto a circumferentially continuous groove 66' which provide snap-in retention of retainer 60' relative to disc 24' in the same manner as retainer 60 described previously. However, retainer 60' has a relatively shallow angle frusto-conical wall portion 132 which extends axially outwardly almost flush with the outboard face of the decorative overlay body 44' (FIG. 12). Wall 132 terminates at a radially in-turned flange 134 which is adapted to receive an ornamental decorative hub cap or the like releasably secured thereto to cover the opening defined by flange 134. Since lip 134 is relatively short radially of the insert, water collection within retainer 60' is not a problem. The "full-face" appearance of wheel 130 is obtained by suitably designing the hub cap (not illustrated) received on lip 134 to be compatible with the exterior configuration imparted by the urethane overlay 44'. As in the previous retainer embodiments, the urethane material of overlay 44' is retained spaced away from the potentially high temperature zones 64' and 62' of disc 24', and permanent retention of retainer 60' is obtained by overlay 44' being bonded thereto.

From the foregoing description it will now be apparent that a composite styled metal-elastomer wheel construction of the present invention overcomes the heat cracking or melting of the urethane foam in extreme adverse applications while enabling the decorative overlay to retain a "full-face" appearance, as well as to have decorative three dimensional contours at least adjacent to, if not directly in, the center area of the wheel in the vicinity of the bolt circle hot spot area. Moreover the various embodiments of retainers are relatively inexpensive to manufacture, versatile in nature, adaptable to different decorative design, reliable in service and adaptable to securely support the removable center ornamentation such as detachable decorative hub caps or the like. It is also to be understood that, although the foregoing description and drawings describe and illustrate in detail various successful working embodiments of the present invention, to those skilled in the art to which the present invention relates, the present disclosure will suggest many modifications in construction as well as widely differing embodiments and applications without thereby departing from the spirit and scope of the invention. The present invention, therefore, is intended to be limited only by the scope of the appended claims and the applicable prior art.

I claim:

1. In a composite styled vehicle wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein in a zone of said disc subject to high temperatures generated during vehicle braking, said overlay having aperture means registering coaxially with said central aperture and holes in said disc and adapted to receive wheel hub mounting parts therein, the improvement wherein said aperture means comprises retainer means secured to the outboard face of said disc and having wall means spaced radially outwardly from said disc central aperture and disc holes, said retainer wall means encircling said disc holes and having a sealing engagement with said outboard face of said disc in a zone thereof spaced radially outwardly of said disc holes for separating said overlay material from the portion of said disc defining said central aperture and disc holes to thereby maintain said overlay material spaced axially away in an outboard direction from the high temperature zone of said disc, said overlay material engulfing at least a portion of said wall means so as to at least partially embed said retainer means in said overlay to thereby hide said retainer means from view and assist in securement thereof to said disc, said retainer wall means having a radially in-turned outboard flange defining a central opening in said retainer means spaced axially outward from said disc central aperture and from said bolt holes and being adapted for releasable engagement with a detachable hub cap for closing said central opening in said retainer means.

2. The wheel construction set forth in claim 1 wherein said overlay is cast and cured against said metallic portion with said retainer means pre-secured to said disc.

3. The wheel construction set forth in claim 1 wherein said disc outboard surface is provided with projection means and said retainer means has resilient yieldable means engageable with said disc projection means for snap-in retention of said retainer means on said disc.

4. The wheel construction set forth in claim 3 wherein said retainer means comprises an annulus member having a side wall flange and a radially in-turned free edge flange at the inboard end of said side wall flange adapted to slide over said projection means on said disc during insertion of said retainer means on said disc, said side wall flange having a circumferentially continuous groove adapted to register with said projection means in the seated position of said retainer means.

5. The wheel construction set forth in claim 3 wherein said retainer means has a generally hoop-like configuration with a radially in-turned free edge flange at its inboard end adapted to slide over said projection means of said disc, a circumferentially continuous external groove contiguous with said free edge flange and disposed axially outboard therefrom for seating on said projection means of said disc and a generally axially extending wall portion dimensioned to extend axially outboard from the outermost outboard protrusion of said disc and terminating adjacent the outboard face of said overlay, said outboard flange of said retainer defining a single large central opening in the outboard face of said overlay, said outboard flange having means for detachably securing the hub cap to said retainer means to cover said single central opening to provide a full-face appearance to said overlay.

6. The wheel construction set forth in claim 1 wherein said retainer means comprises an annular member having a generally hat shape with said wall means comprising a peripheral side wall flange inclined radially inwardly toward the axis of said retainer at an angle complementary to the angular orientation of said disc in said zone thereof disposed radially outwardly of said disc bolt holes, and a radially extending end wall with a plurality of apertures therein registering individually with said disc bolt holes and having a center aperture registering with said disc center aperture, said overlay covering the outer face of said radial wall to provide a full-face appearance to the outboard face of the overlay.

7. The wheel construction set forth in claim 6 wherein said retainer means includes hollow shield members inserted individually into said apertures and said retainer radial wall coaxially with each associated disc bolt hole and engaging said retainer radial wall and said disc around the margins of the aligned holes to provide a waterproof shield around said associated aperture and hole to prevent water collection in the interior space defined between said retainer means and said juxtaposed portion of said disc.

8. The wheel construction set forth in claim 6 wherein said retainer means has an interior wall configuration to provide water drainage from the interior space of said retainer means through the outboard aperture means of said retainer means.

9. The wheel construction set forth in claim 8 wherein said retainer means is formed of injection molded plastic material with an interior wall surface on said flange means generally flush with the radially outermost portion of said apertures in said radial wall of said retainer means.

10. The wheel construction set forth in claim 1 wherein said retainer means has outer end wall means generally radially spanning and spaced axially outward from said disc bolt holes and defining a surface covered by the material of said overlay to provide with the hub cap attached to said retainer means a full-face appearance of said decorative overlay while maintaining the material of the same away from the high temperature zones of said disc.

11. In a composite styled wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein, said overlay having aperture means registering coaxially with said central aperture and holes in said disc and adapted to receive wheel hub mounting parts therein, the improvement wherein said aperture means comprises retainer means secured to the outboard face of said disc and being spaced radially outwardly from said disc central aperture and disc holes, said retainer means having wall means encircling said disc holes and separating said overlay material from the portion of said disc defining said central aperture and disc holes, said overlay material engulfing said wall means so as to at least partially embed said retainer means in said overlay to thereby hide said retainer means from view and assist in securement thereof to said disc, said retainer means comprising an annular member having a generally hat shape with a peripheral side wall flange inclined radially inwardly toward the axis of said retainer at an angle complementary to the angular orientation of said disc in a zone thereof disposed radially outwardly of said disc bolt holes, said retainer having a radially extending end wall with a plurality of apertures therein registering individually with said disc bolt holes and having a center aperture registering with said disc center aperture, said overlay covering the outer face of said radial wall to provide a full-face appearance to the outboard face of the overlay.

12. The wheel construction set forth in claim 11 wherein said retainer means includes hollow shield members inserted individually into said apertures and said retainer radial wall coaxially with each associated disc bolt hole and engaging said retainer radial wall and said disc around the margins of the aligned holes to provide a waterproof shield around said associated aperture and hole to prevent water collection in the interior space defined between said retainer means and said juxtaposed portion of said disc.

13. The wheel construction set forth in claim 11 wherein said retainer means has an interior wall configuration to provide water drainage from the interior space of said retainer means through the outboard aperture means of said retainer means.

14. The wheel construction set forth in claim 13 wherein said retainer means is formed of injection molded plastic material with an interior wall surface on said flange means generally flush with the radially outermost portion of said apertures in said radial wall of said retainer means.

15. In a composite styled wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein, said overlay having aperture means registering coaxially with said central aperture and holes in said disc and adapted to receive wheel hub mounting parts therein, the improvement wherein said aperture means comprises retainer means secured to the outboard face of said disc and being spaced radially outwardly from said disc central aperture and disc holes, said retainer means having wall means encircling said disc holes and separating said overlay material from the portion of said disc defining said central aperture and disc holes, said overlay material engulfing said wall means so as to at least partially embed said retainer means in said overlay to thereby hide said retainer means from view and assist in securement thereof to said disc, said retainer wall means having a radially in-turned outboard flange defining a central opening in said retainer means spaced axially outward from said disc central aperture and from said bolt holes and being adapted for releasable engagement with a detachable hub cap for closing said central opening in said retainer means, said retainer means having an outer end wall means generally radially spanning and spaced axially outward from said disc bolt holes and defining a surface covered by the material of said overlay to provide a full-face appearance of said decorative overlay while maintaining the material of the same away from the high temperature zones of said disc.

16. In a composite styled vehicle wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein in a zone of said disc subject to high temperatures generated during vehicle braking, said overlay having aperture means registering coaxially with said holes in said disc and adapted to receive wheel hub mounting parts therein, the improvement wherein said aperture means comprises retainer means secured to the outboard face of said disc and having wall means spaced radially outwardly from said disc holes, said retainer wall means encircling said disc holes and having a sealing engagement with said outboard face of said disc in a zone thereof spaced radially outwardly of said disc holes for separating said overlay material from the portion of said disc defining said central aperture and disc holes to thereby maintain said overlay material spaced axially away in an outboard direction from the high temperature zone of said disc, said overlay material engulfing at least a portion of said wall means so as to at least partially embed said retainer means in said overlay to thereby hide said retainer means from view and assist in securement thereof to said disc, said overlay being cast and cured against said metallic portion with said retainer means pre-secured to said disc, said retainer means comprising an annular member having a generally hat shape with said wall means including a peripheral flange disposed radially outwardly of said disc bolt holes, and a generally radially extending end wall with a plurality of apertures therein registering individually with said disc bolt holes, said overlay covering the outer face of said radial wall to provide a full-face appearance to the outboard face of the overlay, said retainer means including hollow shield means protruding axially inwardly individually from said apertures in said retainer radial wall coaxially with each associated disc bolt hole and engaging said disc around the margins of the aligned disc bolt holes to provide a waterproof shield around said associated aperture and hole to prevent water collection in the interior space defined between said retainer means and said juxtaposed portion of said disc.

* * * * *